July 15, 1952 M. TURCHAN ET AL 2,603,117
TEMPLATE CONTROLLED MACHINE TOOL
Filed Aug. 11, 1947 7 Sheets-Sheet 5
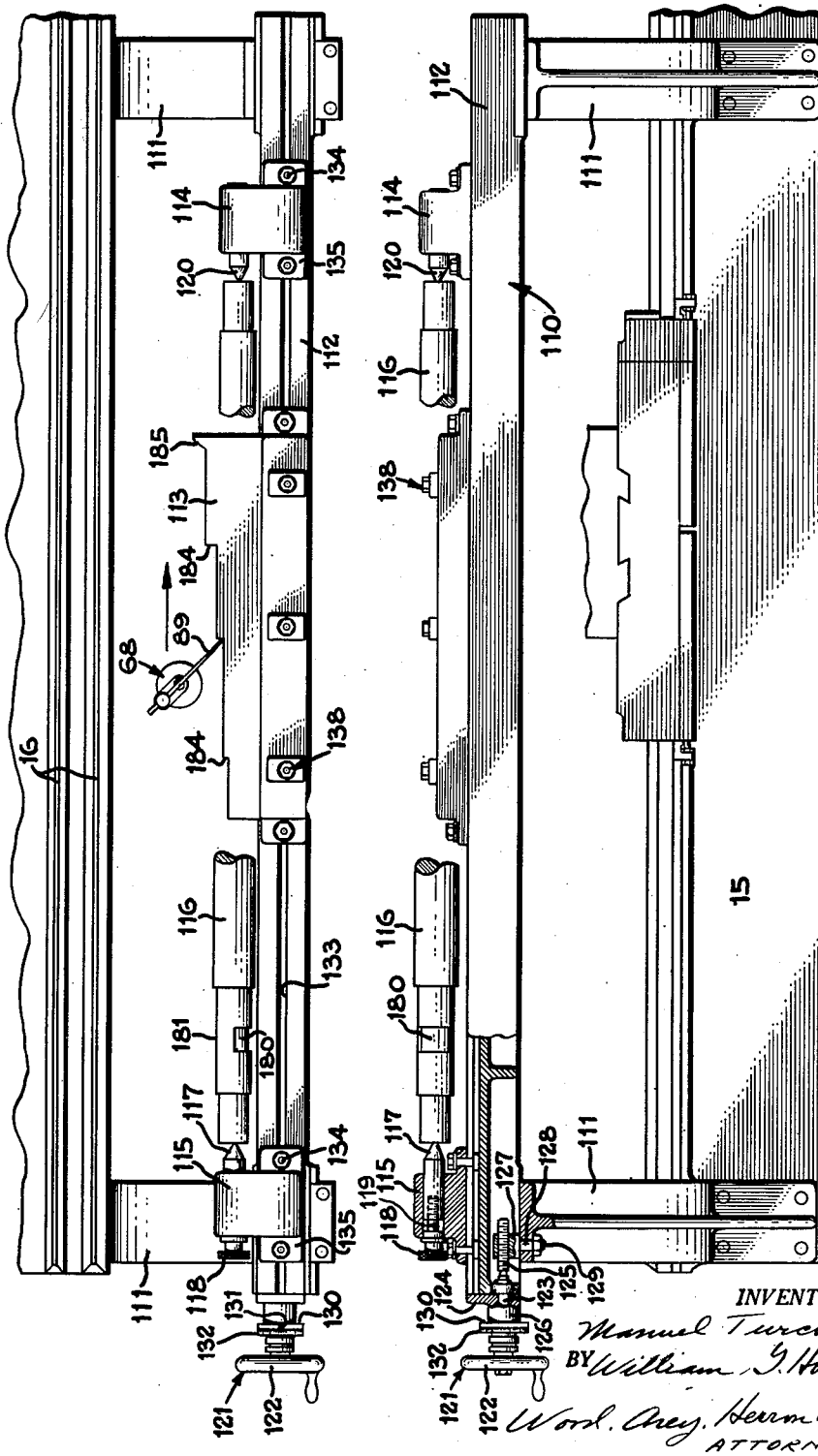
INVENTORS
Manuel Turchan
BY William G. Hoelscher
Wood, Arey, Herron & Evans
ATTORNEYS

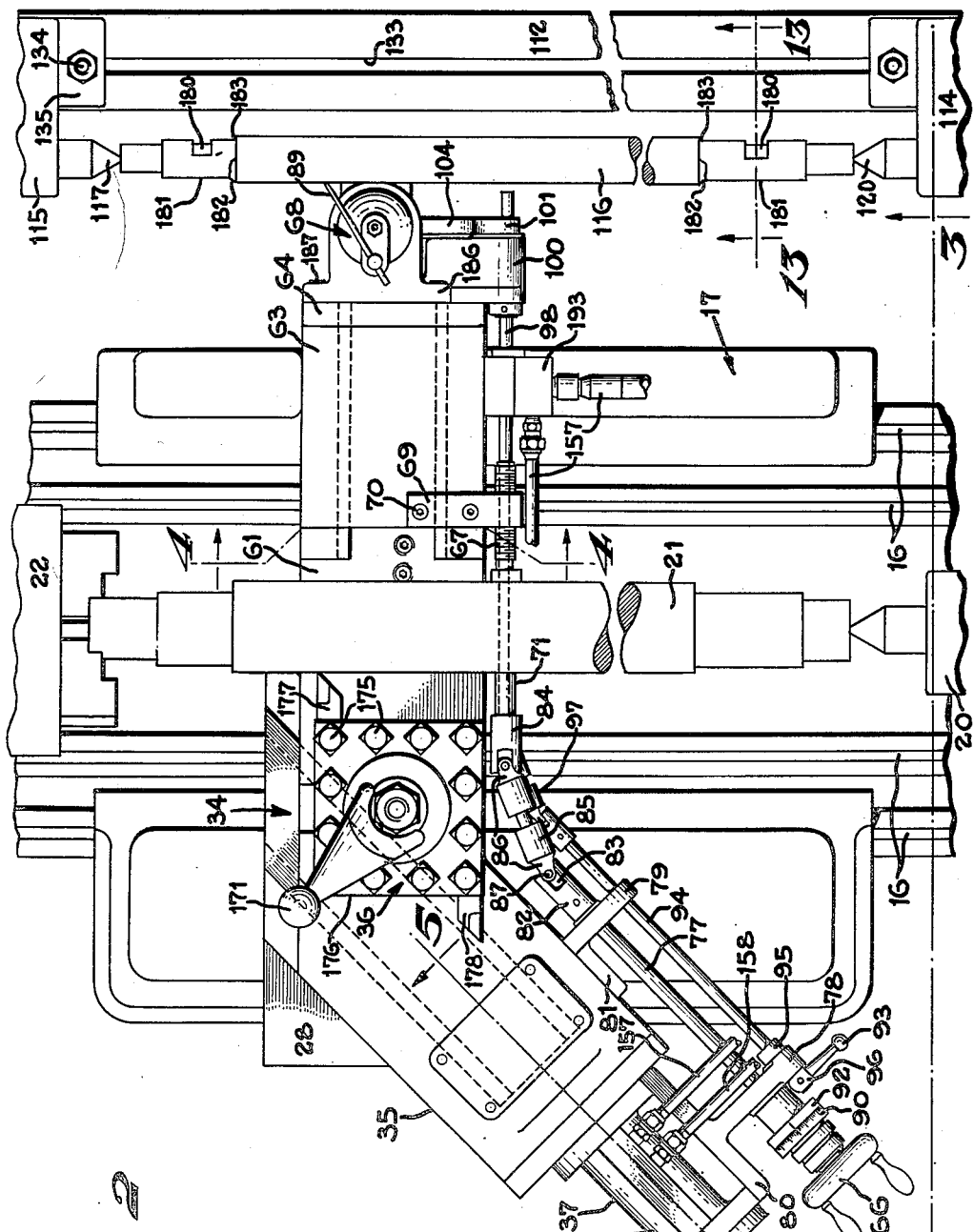

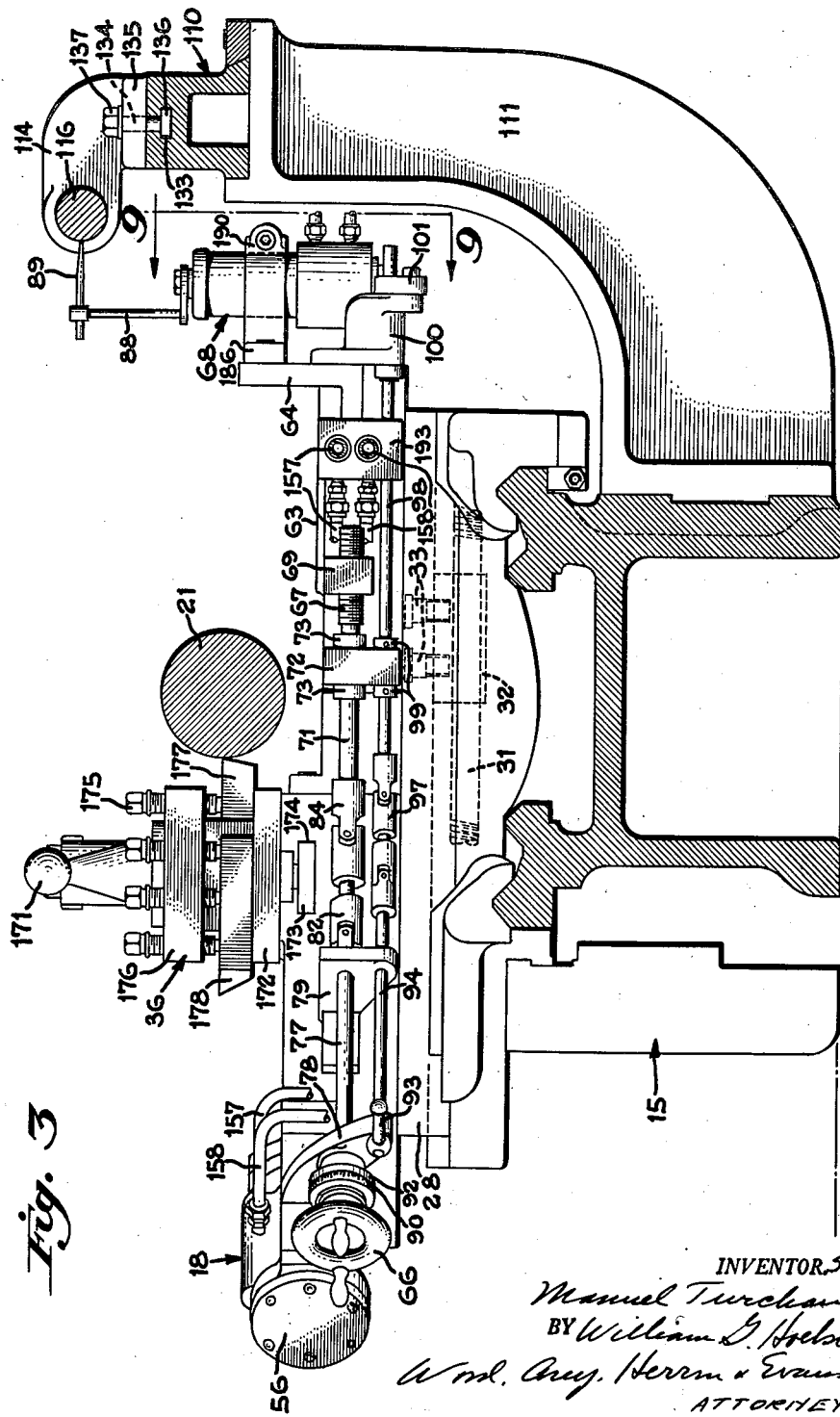

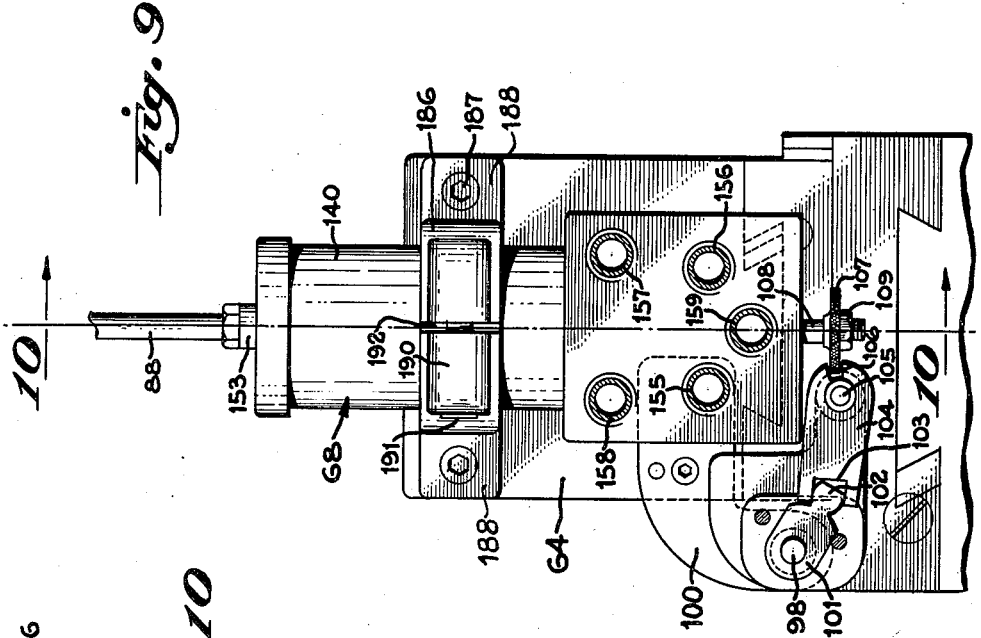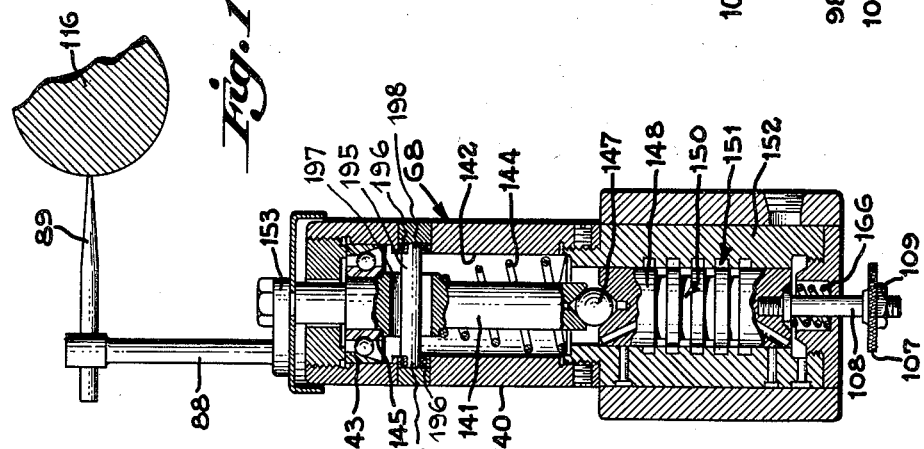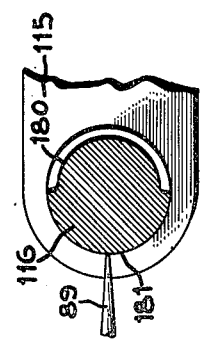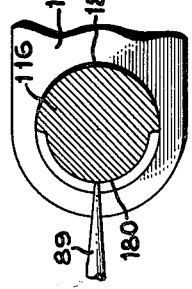

Patented July 15, 1952

2,603,117

UNITED STATES PATENT OFFICE 2,603,117

TEMPLATE CONTROLLED MACHINE TOOL

Manuel Turchan, Dearborn, Mich., and William G. Hoelscher, Cincinnati, Ohio, assignors to The American Tool Works Company, Cincinnati, Ohio, a corporation of Ohio Application August 11, 1947, Serial No. 767,920

4 Claims. (Cl. 82—14)

This invention relates to machine tools and is particularly directed to a lathe having a hydraulically operated duplicating apparatus by means of which the work contour may be reproduced from a template bearing the desired profile.

In turning a series of duplicate parts on a lathe at a production scale of operation, it has been the practice to utilize a lathe equipped with mechanical means to cause the lathe automatically to produce a predetermined work profile. If the work includes steps or shoulders between a plurality of diameters, one practice has been to provide stop dogs both in the path of longitudinal carriage travel and in the path of cross feed travel of the tool slide. Thus, the longitudinal stop dogs serve to locate the shoulders longitudinally of the work while the cross feed dogs serve to locate the cutting tool relative to the axis of the work to provide the required diameters. The longitudinal feed dogs and cross feed dogs are, of course, properly interrelated so as to develop the proper diameter at the respective shoulders. However, such equipment is not readily adaptable to the reproduction of curves and angles, is difficult to set up initially and is subject to inaccuracies.

The present apparatus provides an automatic cutting operation which accurately and rapidly duplicates work pieces by means of a stylus which traces directly the work profile from a template bearing the required shoulders and diameters. The tracer finger or stylus lightly contacts the surface of the template and is carried by a hydraulic control valve which, in turn, is connected to a hydraulic cylinder which controls movements of the tool slide. The control valve and stylus provide a tracer unit and the stylus, being in contact with the template, actuates the cylinder and tool slide in the manner of a servo-mechanism so that the cutting tip of the tool follows precisely the longitudinal and transverse movements of the stylus as it traces the template profile. For this purpose the tracer unit and cutting tool are mounted upon a cross slide which, in turn, is mounted upon the carriage. Thus, the tip of the stylus and the edge of the cutting tool normally move together longitudinally and transversely in fixed relationship.

The slideway upon which the slide plate carrying the cutting tool and tracer unit are mounted is disposed preferably at an angle of 45° with respect to the longitudinal axis of the work, so that disregarding the longitudinal feed of the carriage, the motion of the cutting tool and stylus would follow a line at 45° to the work axis. However, during lathe operation the carriage moves longitudinally at a rate correlated with the tool and stylus rate of movement. Thus when the stylus traces a right angular shoulder these movements are combined to produce a feeding motion of the tool and stylus at right angles to the axis of the work. Consequently, the apparatus will duplicate from the template not only square shoulders, but also it will duplicate angles, curves or a combination of these.

A very minute stylus movement instantly causes a corresponding tool slide adjustment. Therefore the tip of the cutting tool follows minutely the path traced by the stylus and very slight template deviations are reproduced faithfully in the profile of the work.

It will be apparent that the template profile is reproduced in the work piece independent of the diameter of the work. In other words, the template controls the profile only, the diameter being determined by the location of the tip of the cutting tool relative to the tip of the stylus. Thus with the template and work piece arranged in parallel fixed relationship in the lathe, shifting the stylus relative to the cutting tool will increase or decrease the diameter of the work. For this reason the present apparatus includes adjusting means such that the stylus may be adjusted to establish a required diameter. This adjustment is made initially to establish one of the work diameters and thereafter the various diameters will follow automatically according to the profile of the template. Having properly been set up, the cutting operation can be repeated automatically at a production rate of operation without further adjustment.

The template may be in the form of a cylindrical bar which may be turned at low cost on a lathe or it may be in the form of a flat plate bearing on its edge the desired profile. In the instance of the cylindrical template, it may be either of the same diameter as the work to be reproduced or, if desired, it may be of a smaller diameter in order to reduce weight and minimize cost. An additional advantage of the cylindrical template resides in the fact that the same template may be used both for the roughing and finishing cuts for which purpose the roughing side of the template may have a slightly altered contour to eliminate from the profile those minor forming operations which are performed during the finishing cut. The basic profile thus is delineated by the roughing side of the template and secondary forming operations such as undercuts sharp corners, grinding necks and shallow grooves may be formed during the finishing operation. For this purpose, the carriage is returned to the starting end of the template after the roughing cut is completed, the template is rotated 180° upon its axis to present its finishing side to the tip of the stylus, and a finishing tool is presented to the work, whereupon the cycle is repeated to perform the finishing operation.

Briefly therefore, the invention resides in an improved hydraulic duplicating apparatus having a tool slide shiftable along a line angularly related to the longitudinal axis of the work to develop lateral profile movements of the cutting tool and tracer unit by the combined longitudinal and angular movements of the carriage and tool slide respectively relative to the profile of a template.

It has been a primary object to simplify adjustment in establishing a basic work diameter by disposing the stylus and cutting tool substantially in alignment at right angles to the template and providing adjustment means to shift the stylus in a line at right angles relative to the template. By adjusting the stylus directly at right angles to the template, direct reading micrometer dials may be utilized in turning down the work manually to a required basic diameter preliminary to automatic operation. Also alignment of the stylus and tool disposes the template and work in substantial alignment longitudinally to facilitate direct comparison between the template and work.

Another object has been to provide a turret type tool post bearing both a roughing and finishing tool in combination with a single roughing and finishing template whereby, after a roughing cut, the template may be indexed to present a finishing profile to the stylus and the tool post indexed to present a finishing tool to the work, whereby the apparatus may be set up initially both for the roughing and finishing operation to permit high speed precision reproduction of work pieces.

A further object has been to provide manual control means whereby the hydraulically operated automatic operation of the apparatus may be halted conveniently to place the apparatus under the manual control of the operator.

A further object has been to provide means whereby either a flat template or a cylindrical template may be alternatively mounted for use upon the same template mounting fixture.

Another object has been to provide adjusting means for the template mounting apparatus whereby the template may be mounted and shifted longitudinally relative to the work piece so as to locate the template profile conveniently and quickly at its proper position with reference to the work piece profile.

A further object has been to provide an improved tracer valve including a vertically extended actuating stem with a horizontal template tracing stylus at its upper end, the stem being adapted to be shifted angularly either in a lateral or longitudinal direction to actuate the valve but having means to prevent rotation of the stem relative to the valve so that the stylus is maintained in a fixed angular relationship with the template during its tracing movements.

Further objects and advantages of the invention will be more fully set forth in a detailed description with reference to the accompanying drawings in which:

Figure 2 is a fragmentary top plan view of the lathe showing the carriage and cross feed mechanism with the duplicating apparatus mounted thereon and showing a work template and work piece installed in operating relationship in the lathe.

Figure 3 is a cross section taken on line 3—3 Figure 2, further illustrating the lathe bed, carriage and duplicating apparatus with respect to the work and template or master.

Figure 7 is a rear view of a portion of the lathe illustrating the fixtures for mounting the templates in tracing position.

Figure 8 is a top plan view projected from Figure 7, further illustrating the template mounting apparatus.

Figure 9 is a fragmentary view taken along line 9—9, Figure 3, illustrating the hydraulic tracer or control valve assembly.

Figure 10 is a longitudinal sectional view taken on line 10—10 Figure 9, generally illustrating the internal structure of the hydraulic control valve.

Figure 13 is an enlarged cross sectional view taken on line 13—13 Figure 2, showing the work template in a rough cutting position.

Figure 14 is a view similar to Figure 13 showing the template rotated to a position for making the finish cut.

Figure 1:
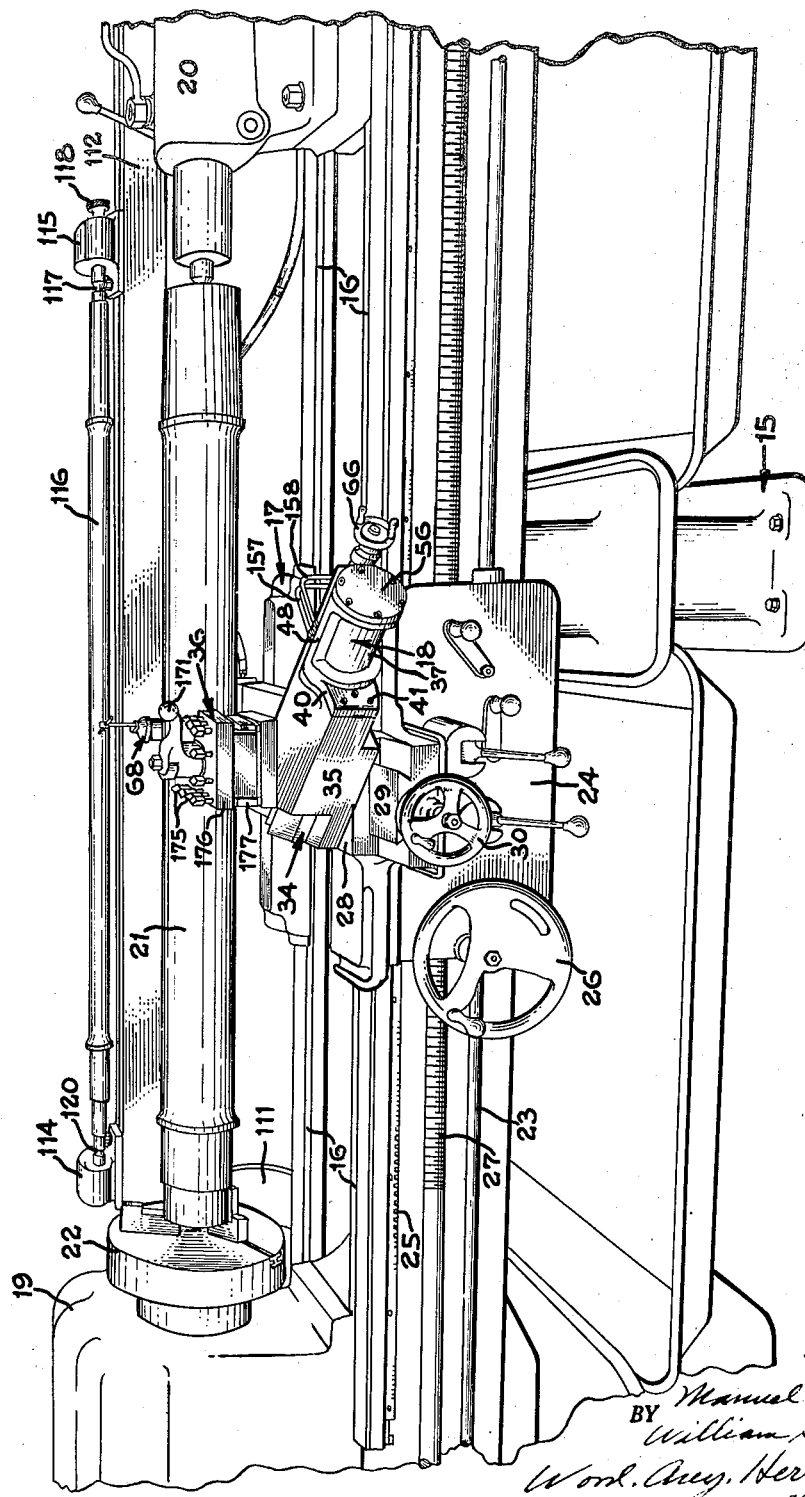
Figure 1 is a fragmentary perspective view from the front, illustrating a lathe equipped with the improved duplicating apparatus.

The duplicating apparatus as illustrated in Figure 1, is applied to a lathe having the usual bed 15, including longitudinal slideways 16, upon which is slidably mounted a carriage indicated generally at 17. In the present instance, the duplicating apparatus, indicated generally at 18, is mounted upon the upper surface of the carriage. A head stock indicated at 19 is mounted at the left-hand end of the lathe bed and a tail stock 20 is mounted upon the opposite end. The work piece, indicated at 21 is carried between the head and tail stocks in the usual manner and is rotated by engagement with the chuck 22 driven by a gear train in the head stock.

A longitudinal carriage feed shaft or rod 23 extends along the front of the lathe bed, driven by a gear train in conjunction with the head stock driving mechanism. This shaft is provided with a longitudinal spline or key way which engages a gear train located in the carriage apron 24 in the usual manner. This gear train includes a pinion (not shown) meshing with a rack 25 secured to the lathe bed to provide longitudinal translation of the carriage at a fixed rate of feed.

Power cross feed for the cutting tool is supplied by the hydraulic duplicating equipment.

In the operation of the lathe under hydraulic control, the carriage traverse feed shaft 23 is utilized for longitudinal traverse of the carriage in conjunction with the hydraulic tool cross feed and also may be utilized for power rapid traverse or carriage return at the end of the longitudinal cutting travel. In other words at the end of the cut the operator may actuate a control lever to connect shaft 23 through the apron gearing to drive a pinion in mesh with rack 25 in a reverse direction to return the carriage to its starting position by power. Also the operator may return the carriage manually by rotating the hand wheel 26 which is connected to the rack 25 through a pinion gear. A lead screw 27 also may be installed for carriage traverse to be used in duplicating certain classes of work, if desired.

The duplicating apparatus may be mounted directly upon the lathe carriage. However, in the present disclosure, it is carried as a unit upon a slide block 28 mounted in the usual manner upon the transverse dovetail slideway 29 of the carriage. Slide block 28 may be shifted manually by the hand wheel 30 which is attached to the outer end of a screw shaft 31, as shown in Figure 3. The opposite end of screw shaft 31 is in threaded engagement with a block 32 attached by screws 33 to the under side of slide block 28. Therefore, rotation of the hand wheel 30 shifts the block 27 and duplicating mechanism as a unit laterally relative to the carriage. This structure is not an essential part of the present invention and is not utilized in conjunction with the hydraulic apparatus but may be utilized to operate the lathe manually independent of the hydraulic control system. For this reason it may be omitted and the hydraulic control apparatus be mounted directly upon the carriage.

Figure 5:
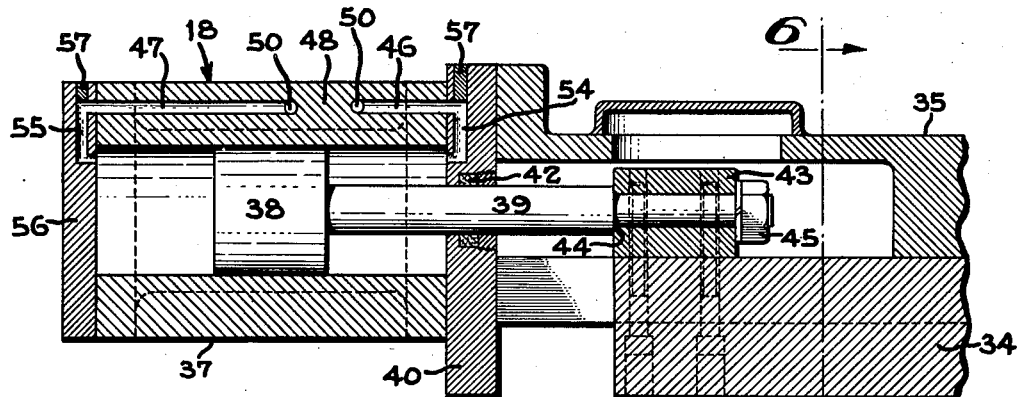
Figure 5 is a sectional view taken on line 5—5 Figure 2, illustrating the mounting of the hydraulic cylinder and tool slide relative to its slideway.

The hydraulically operated cross feed assembly 18 is carried upon a slideway 34 formed in the upper surface of the slide block 28 and disposed preferably at an angle of 45° to the longitudinal axis of the carriage. A slide plate 35 is engaged upon this slideway and upon the slide plate is mounted a tool post generally indicated at 36. As shown in Figure 5, the outer end of slide plate 35 includes a hydraulic cylinder 37 having a piston 38 slidably disposed therein to which is secured a piston rod 39 extending through the cylinder head or closure plate 40.

This plate may be formed as an integral part of the cylinder or may constitute a separate element suitably secured to the cylinder as shown. In either event, the cylinder assembly is secured by means of screws 41 passing through the closure plate 40 into the end flange of the slide plate 35. The piston rod 39 is slidably sealed with respect to the plate 40 by means of a packing gland 42 of any preferred design. The outer end of the piston rod is anchored to the slideway 34 as shown in Figure 5 by means of a lug 43 bolted to the slideway. A shoulder 44, formed in the piston rod, engages one side of the lug and a lock washer and nut 45 clamp the rod securely to the lug. It will be apparent, therefore, that by admitting fluid pressure into the left-hand end of the cylinder as viewed in Figure 5, the cylinder and slide plate 35 will be shifted relative to the slideway 34 to the left or away from the work thereby increasing the work diameter, and admission of fluid to the right-hand end will decrease work diameter.

The passageways for admission of fluid into the cylinder are indicated at 46 and 47 respectively for the right and left-hand ends of the cylinder. The passageways preferably are formed by drilling holes from opposite ends into a longitudinal rib 48 formed in the upper side of the cylinder wall. These passageways communicate respectively with lateral drilled passageways 50—50 to which are connected hydraulic fluid pressure lines communicating with a hydraulic control valve hereinafter described. By means of the tracer valve a metered supply of fluid under pressure is conveyed to the cylinder when the valve is actuated, thereby to adjust slide plate 35 and its tool post relative to the work. The respective passageways 46 and 47 communicate with right angular passageways 54 and 55 in the respective cylinder heads or closure plates 40 and 56. The inner ends of these lateral passageways connect by means of right angled passageways drilled through the respective closure plates to provide openings into the opposite ends of the cylinder. The passageways 54 and 55 include plugs 57—57 tapped or otherwise engaged therein to seal off the passageways.

Figure 6:
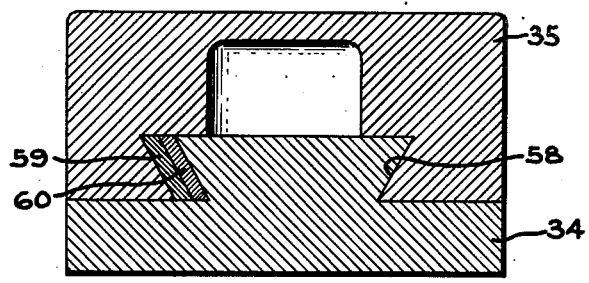
Figure 6 is a cross sectional view taken on line 6—6 Figure 5, further illustrating the tool slide structure.

Described in detail, the slide plate 35 which mounts the tool post 36, is slidably mounted upon the slide way 34 by means of a dovetail 58 as shown in Figure 6. The dovetail 58 includes adjustable tapered gib plates 59 and 60 to take up any looseness between the slide plate and dovetail. These gib plates are arranged for longitudinal takeup by means of adjustment screws. Since this structure follows the prevailing practice and does not form an essential part of the present invention, the specific structure is not disclosed in detail.

In the present instance, as shown in Figure 2, the dovetailed guide rail 34 is disposed at an angle of 45° relative to the longitudinal axis of the work 21 so as to cause the cutting edge of the tool to describe an angle of 45° relative to the work when the slide plate is actuated by the hydraulic cylinder. However, during the cutting operation the carriage is translated longitudinally at a rate of feed correlated with the rate of slide movement. Therefore, the two motions combined result in a right angular line of movement of the cutting tool relative to the longitudinal axis of the work. This resultant makes possible the turning of shoulders at right angles to the axis of the work and also the duplication of irregular profiles and shoulders having curves or angles other than right angles, as will hereinafter be disclosed.

Figure 4:
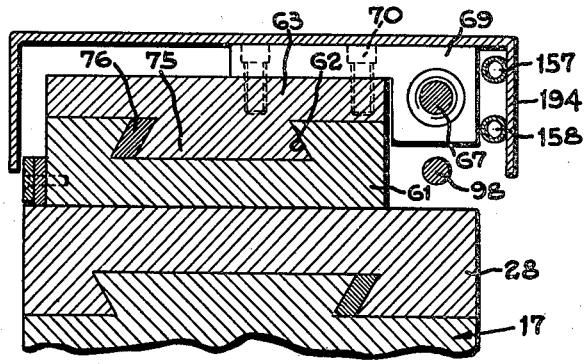
Figure 4 is a cross sectional view taken on line 4—4 Figure 2, illustrating the carriage cross feed slide upon which is mounted the hydraulically controlled tool slide assembly.

It will be noted in Figures 2, 3 and 4 that the tool post slide plate 35 upon which is mounted the tool post and cutting tool, includes an arm 61 which extends inwardly across the lathe bed at right angles, resting upon the upper surface of slide block 28. The inner end of arm 61 includes a dovetail groove 62 in which is mounted a slide block 63. The rearward end of slide block 63 includes a vertical flange 64 upon which is mounted the hydraulic tracer or control valve unit 68. The slide block 63 permits the control valve unit to be adjusted transversely of the longitudinal axis of the lathe relative to the tool post slide plate 35, to vary the distance between the cutting tool and stylus to control work diameter as hereinafter disclosed. For this purpose the slide block 63 is engaged by a screw threaded shaft which in turn is connected for rotation to a hand wheel 66 at the front of the carriage mounted adjacent the hydraulic cylinder 37. This apparatus permits the control valve and its slide block 63 to be adjusted directly at right angles to the template in setting up the lathe initially to obtain the required work diameter.

Described in detail, the adjusting screw 67 of the adjusting apparatus is in threaded engagement with a laterally extended lug 69 attached by means of screws 70 to the upper surface of slide block 63 (see Figure 3). Screw shaft 67 includes an extension shaft 71 which is journalled in a bearing block 72 secured to the arm 61. Upon this shaft is pinned or otherwise secured a pair of collars 73—73 embracing the opposite sides of the bearing block 72. Longitudinal motion of screw shaft 67 is thereby prevented and upon rotation of the hand wheel 66 the screw 67 causes the lug 69 and slide block 63 to be shifted relative to the slideway groove 62 thus adjusting the control valve 68 and stylus relative to the cutting tool. As shown in Figure 4 the slide block 63 includes a dovetail slide rail 75 confined in the dovetail groove 62 formed in the arm 61 and, following the usual practice, a gib plate 76 is interposed between the dovetail 75 and the groove 62 to permit clearance adjustment.

The hand wheel 66 for screw shaft 67 is secured on the outer end of a shaft 77 journalled in bearing brackets 78 and 79. Bracket 78 includes a foot 80 which is secured by screws to the side of the hydraulic cylinder 37 and bracket 79 includes a foot 81 secured to the side of the tool post slide plate 35. Upon the inner end of shaft 77 is keyed or pinned a sleeve 82 having its end bifurcated as at 83 to form a yoke. Extension shaft 71 upon which the end of screw shaft 67 is formed, likewise includes a sleeve 84 having a yoke similar to the yoke 83 of sleeve 82. These sleeves are connected together by means of a universal joint element 85 having yokes 86—86 at opposite ends which are connected to the sleeves 82 and 84 by means of cross pin elements 87 to provide a universal joint. Therefore, when shaft 77 is rotated, the motion is transmitted through the universal joint to shaft 71 to rotate screw 67 and shift the control valve slide block 63 in its dovetail groove 62 to change its position transversely of the lathe bed.

As previously noted, the adjusting apparatus above described permits adjustment of the control valve 68 and its tracer finger or stylus 89 relative to the tool post slide 35. In other words, while the profile of the template is duplicated exactly by the action of the stylus and control valve, the diameter of the work is determined by adjusting the edge of the cutting tool relative to the tip of the stylus. By way of example, it will be noted in Figure 2 that the work diameter is considerably greater than the diameter of the template or model. Therefore, in setting up the lathe, the carriage may first be positioned at the tailstock end of the machine and the stylus adjusted to contact the smallest diameter of the template. Assuming that the tool slide plate 35 is in its outward position, the hand wheel 66 is then rotated to move the control valve away from the template. As the stylus loses contact with the template the control valve opens to cause hydraulic pressure to be metered to the cylinder. This causes the tool post slide plate 35 to feed inwardly to compensate for the distance the tip of the stylus is drawn away from the template surface. This movement carries the control valve and stylus toward the template because both the tool post and valve are carried in common upon slide plate 35. As soon as contact is re-established with the template surface, the control valve is closed and in-feed motion of the tool slide plate 35 is halted. In other words, the slide unit 35 tends always to move toward the template until the stylus or tracer finger contacts the template to hold the control valve in closed position. Therefore by retracting the control valve through hand wheel 66 the entire unit 35 feeds inwardly to re-establish contact of the stylus with the template. The in-feed operation of hand wheel 66 is continued until the edge of cutting tool reduces the first diameter of the work stock to its required dimension.

In order to establish the proper diameter for the first cut, the operator may use a suitable measuring instrument such as a micrometer, depending upon the precision required. Also, if desired, the hub of the hand wheel 66 may be provided with a graduated micrometer dial indicated at 90. This dial rotates unitarily with the hand wheel relative to a fixed dial 92 which bears a reference point to provide a micrometer setting of the cutting tool as the work is turned down to its required diameter. The construction of the dial arrangement is well understood in the art, therefore a detailed disclosure of the structure is omitted.

It will be apparent that once having established the required diameter, the succeeding diameters of the work will increase or decrease according to the profile of the template. In other words, the profile of the template will be duplicated precisely in the profile of the work piece although the diameters of the two pieces are not the same. After having been initially set up, the cutting operation will continue automatically for the full length of the template and work and, upon reaching the headstock end of the lathe, the carriage feed is halted either by the operator or by automatic stop means incorporated in the lathe mechanism. The carriage then may be returned to its starting point either manually or by power rapid traverse.

In order to permit the operator manually to control the feed movements of the tool post slide plate 35, a hand control lever 93 is provided. As shown in Figures 2 and 3, this lever is carried upon the end of a control shaft 94 which is journalled in the previously described brackets 78 and 79. Shaft 94 is locked against longitudinal motion by means of a collar 95 bearing against bracket 78. The opposite side of bracket 78 is engaged by the hub 96 of control lever 94. The inner end of shaft 94 connects with a universal joint assembly generally indicated at 97 following substantially the structure of the universal joint assembly described with reference to the shafts 71 and 77. Universal joint assembly 97 connects the control shaft 94 with the valve operating shaft section 98, disposed at an angle to shaft 94. Shaft 98 is journalled at its forward end in bearing block 72 and is locked in position relative to the block by means of a pair of collars 99 embracing the opposite sides of the block in the same manner as the previously described screw shaft extension 71. The inner or rearward end of shaft 98 is journalled in a bracket 100 secured to the flange 64 to which is secured the tracer valve assembly.

The free end of shaft 98 includes a crank arm 101 pinned or otherwise secured to the shaft and the arm 101 includes a lug 102 engaged in a fork 103 forming a part of valve operating arm 104 as shown in Figure 9. Valve operating arm 104 is pivotally mounted on a stud 105 projecting from the bracket 100. A notch 106 is formed in the arm adjacent the stud 105 and the edge of a disc 107 is engaged in this notch. The disc 107 is secured upon the lower end of the control valve operating stem 108 by means of a nut 109. Vertical movement of the stem 108 opens the appropriate ports of the valve, as will be hereinafter described, to cause movement of the tool slide 35 toward or away from the work.

It will be apparent therefore that operation of the control lever 93 will be transmitted through shafts 94 and 98 to shift the control stem 108 up or down by reason of the connection of crank arms 101 and 104 to the stem. Therefore, manual operation of lever 93 will cause retraction or advancement of the cutting tool and control valve depending upon the direction in which the lever is moved. This permits the operator to control the cutting tool independently of the template as in turning down the work to its starting diameter and enables him to withdraw the tool whenever it may be necessary.

As previously noted, the template which controls the work profile is mounted to the rear of the lathe opposite to the operator's side. The apparatus is designed to utilize either a turned template or model, that is one which is circular in cross section and may be formed on a lathe, or it may be utilized in conjunction with a flat template having an edge shaped to provide the desired profile. These templates are carried by a template mounting assembly generally indicated at 110. This assembly is supported upon a pair of brackets 111—111 bolted or otherwise secured to the bed of the lathe and extending upwardly approximately to the level of the work. Upon the upper end of these brackets is mounted a beam 112 of inverted U-shape in cross section extending parallel with the lathe bed. This beam provides a supporting rail either for the flat template 113 or for the round template centering or mounting fixtures indicated generally at 114 and 115.

As shown in Figures 1, 7 and 8 the cylindrical model or turned template 116 is carried between the fixtures 114 and 115 by means of tapered pivot pins similar to lathe centers. The pointed ends of the pins are engaged in centers or holes drilled into opposite ends of the template. For this purpose the pivot pin 117 includes a knurled head 118 having a screw threaded stud 119 in threaded engagement through the center of pin 117. Pin 117 is slidable relative to a bore formed in the fixture 115, therefore rotation of the knob shifts pin 117 longitudinally. The opposite taper pin 120 need not be adjustable and may be pinned or otherwise secured against displacement in the bore of the opposite bracket. The template then is clamped securely between the pins 117 and 120 and maintained securely in position to be traced by stylus 89.

As hereinafter described, the cylindrical model or template 116 may include several profiles for various cutting operations. In the present instance two profiles are disclosed, one for the rough cutting operation and the other for the finishing operation. For this purpose the template may be rotated 180° by hand to present one or the other of its faces to the tip of the stylus to duplicate the exposed profile (see Figures 13 and 14).

In order to align the template properly with the work, adjustment means generally indicated at 121 is provided. This mechanism permits the cross beam 112 of the template mounting apparatus to be shifted longitudinally relative to the brackets 111—111. In other words, after the template is properly mounted between the template centering fixtures 114 and 115, the entire assembly may be shifted as a unit longitudinally relative to the work and thereby properly align the shoulders or profile with the work piece. The particular utility of this adjustment will be more fully disclosed with reference to a detailed account of the duplicating operation.

Described in detail, the adjusting mechanism for the template comprises a hand wheel 122 to which is keyed a shaft 123. (See Figure 7). Shaft 123 is journalled in a bearing bracket plate 124 secured to the end of beam 112. The screw threaded portion 125 of shaft 123 projects through the hub 126 of the bearing bracket and is in screw threaded engagement with a lug 127 secured by means of a stud 128 extending through the supporting leg 111. A nut 129 is engaged on the end of stud 128 to attach the lug to the leg 111. Rotation of hand wheel 122 therefore, shifts the beam 112 longitudinally relative to the support brackets 111. If desired, the bearing hub 126 may be provided with a disc 130 bearing a reference point 131 in conjunction with a second disc 132 which is in facial contact with disc 130. Disc 132 forms a part of and rotates unitarily with the hub of hand wheel 122 and may be provided with a series of graduations, for example in thousandths of an inch so that a micrometer measuring device is provided. Thus, the beam 112 may be shifted as required and the graduated dial provides direct reading of the linear adjustment for the convenience of the operator.

In addition to the adjustment means above described, the centering fixtures 114 and 115 likewise are shiftable relative to the rail beam 112. For this purpose the beam is provided with a longitudinal slot 133 T-shaped in cross section and traversed by bolts 134 passing through the base flanges 135 of the respective centering fixtures. The lower ends of the bolts 134 are provided with heads 136 engaged in the T-slot as detailed in Figure 3. Loosening of the nuts 137 releases the engagement of the bolts relative to the T-slots and permits longitudinal shifting of the centering fixtures relative to the beam 112. This permits adjustment of the centers to accommodate templates of different lengths.

The flat template 113 likewise is secured by means of headed bolts engaged in the T-slot 133. These bolts are indicated generally at 138 and are substantially the same as bolts 134. Loosening of the bolts 138 permits longitudinal shifting of the template relative to the beam 112 in the same manner as the centering fixtures 114 and 115.

*Tracer valve and hydraulic control system*

The hydraulic control valve and the control system are disclosed in Figures 9 to 12 inclusive. Although the specific control system is not an essential part of the present invention, a generalized description of the system is believed to be in order to disclose more clearly the operation of the duplicating mechanism.

The tracer or control valve 68 as illustrated in cross section in Figure 10 comprises in general, a valve body 140 preferably cylindrical in form and including an actuating stem 141 projecting upwardly from the bore 142 of the body.

The upper end of the stem is maintained in centered position by means of a modified ball bearing 143 which permits a limited degree of angular shifting of the stem, the bearing forming in effect a universal joint for the stem. A compression spring 144 forces the stem upwardly and the stem includes a shoulder 145 seated against the bearing 143. The lower end of stem 141 includes a conical recess in which is maintained a bearing ball 147. The opposite side of the bearing ball is engaged in a similar recess formed in the actuating plunger 148 of the valve. A plurality of annular ports indicated generally at 150 are formed in the plunger 148. A corresponding series of annular intake and discharge passageways indicated generally at 151, cooperating with the ports 150 are formed in a cylinder 152 joined to the valve body 140.

The upper end of valve stem 141 is connected to a horizontally offset member 153 by means of nut. The offset member carries in its opposite end a vertical stem 88, and upon the upper end of this stem is affixed the horizontal stylus 89. It will be apparent that a slight pressure exerted upon the tip of the stylus will tend to rock the valve stem 141 about the center of bearing 143. Angular displacement of stem 141 is converted by means of ball 147 into a longitudinal motion of the valve core or plunger 148. In a manner hereinafter described, this longitudinal motion of the valve core 148 delivers fluid under pressure to one or the other sides of cylinder 37 to actuate tool slide 35 in the appropriate direction corresponding in direction and degree to the displacement of the stylus.

Figure 11:
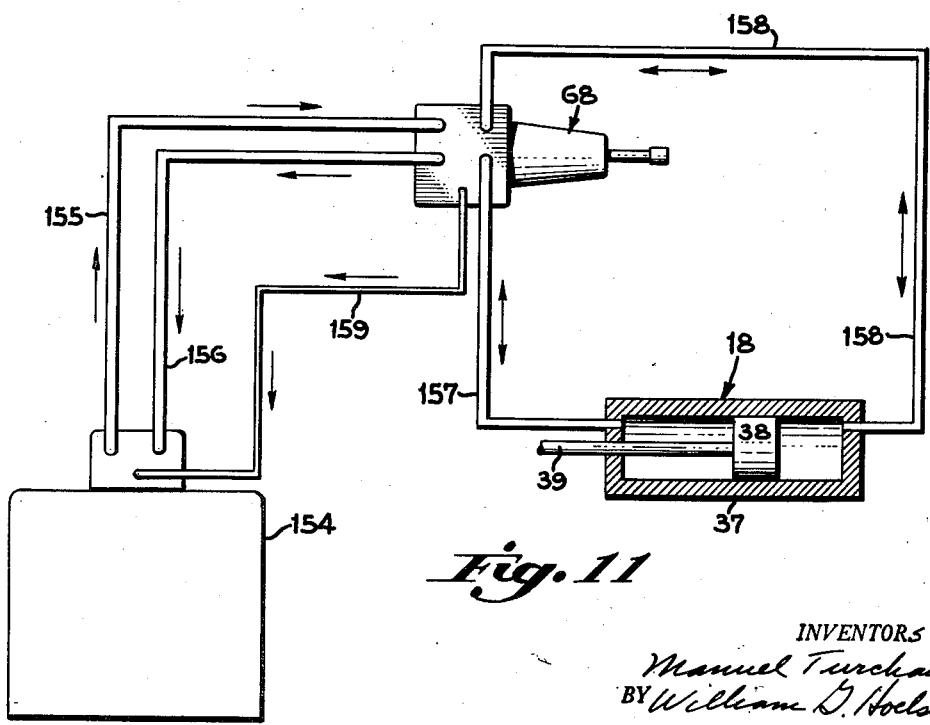
Figure 11 is a diagrammatic view illustrating the hydraulic control system in conjunction with the actuating cylinder which regulates the movements of the tool slide relative to the work.

Referring to Figure 11, the hydraulic fluid is delivered to the control valve from a delivery unit 154 which constitutes a reservoir and delivery pump for the fluid. This unit constitutes a commercially available mechanism and includes a fluid delivery line 155 and a return line 156. The delivery unit may incorporate suitable bypass apparatus to permit continuous operation of the pump with the circulation with lines 155 and 156 cut off at the tracer valve.

The tracer valve connects with the previously noted fluid supply lines indicated at 157 and 158 which lead to the opposite ends of the hydraulic cylinder 37. A return line 159 is connected into the lower portion of the valve communicating with the bore at the end of the valve plunger 148. This line is under constant vacuum to return to the delivery unit any fluid which may leak past the plunger 148 during the operation of the delivery unit 154.

Figure 12:
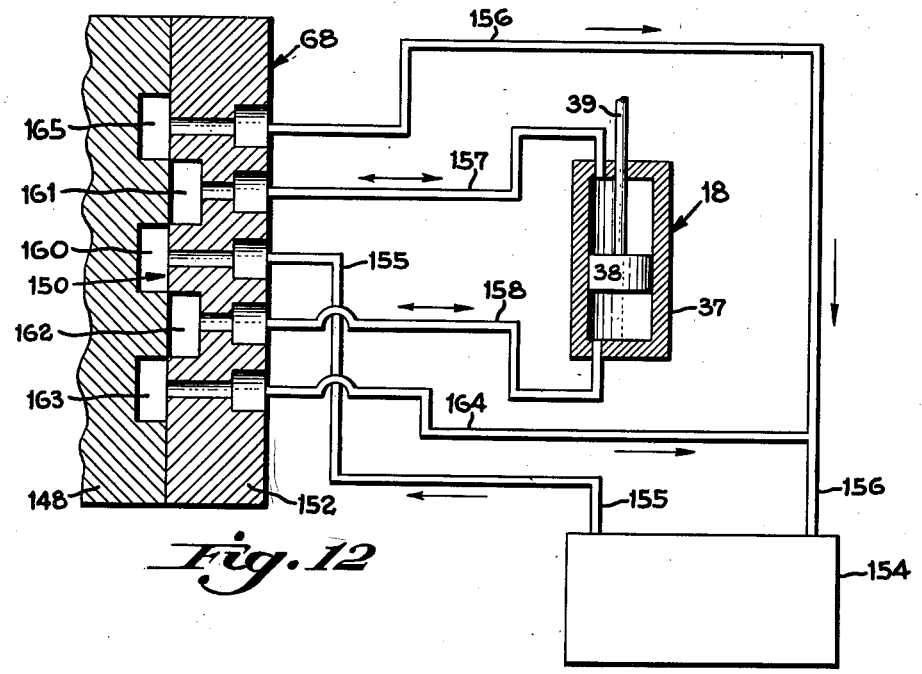
Figure 12 is a diagrammatic view similar to Figure 11 showing in detail the valve ports by means of which is controlled the flow of fluid to the actuating cylinder.

As shown in Figure 12, the valve plunger 148 is illustrated diagrammatically in closed or neutral position in the valve cylinder 152. This view is intended to illustrate the flow of fluid and illustrates on an enlarged scale the relationship of the valve plunger ports 150 relative to the valve cylinder passageways 151 although the number of passageways has been reduced for the sake of simplicity. As shown, pressure line 155 from the delivery unit 154 enters the valve body through a lateral passageway in the valve cylinder communicating with the center port 160 of the valve plunger. In the position shown, the plunger is in a neutral or closed position, therefore the port 160 is blocked and there is no flow of fluid through the valve or to either end of the cylinder 37, therefore, the tool slide 35 remains stationary. When the valve plunger 148 is shifted upwardly, fluid under pressure is delivered from line 155 to port 160 into passageway 161 communicating with the line 157 leading to the inner end of the cylinder 37 to cause feed of the tool slide and tool toward the work.

As fluid enters the cylinder through line 157, it is exhausted from the opposite end of the cylinder through line 158, through passageway 162 which now is in communication with plunger port 163, the fluid passing from port 163 to line 164 opening into the fluid return line 156 to the fluid delivery unit 154. Alternatively if the valve plunger is moved downwardly, pressure 160 will communicate with plunger port 162 to deliver fluid through line 158 to the outer end of cylinder 37 thus causing tool feed away from the work. During this motion, fluid is discharged from the inner end of the cylinder through line 157 to passageway 161 and from passageway 161 into port 165 of the valve plunger. The fluid flows from port 165 through return line 156 back to the delivery unit 154. It will be apparent, therefore, from the foregoing that when the valve plunger is in a neutral position the cylinder and tool slide is stationary; when the plunger moves upwardly, the fluid pressure causes the cylinder and tool slide to move toward the work and when the plunger is depressed, the cylinder and tool slide are fed away from the work.

Referring again to Figure 10 the valve is shown in its neutral position corresponding to the position shown diagramatically in Figure 12. The valve assumes this position when the tracer finger or stylus 89 is in contact with the template. In other words, during normal operation, with the tool slide stationary, the stylus exerts a slight pressure against the template causing the valve plunger to be held in its closed or stationary tool slide position. When the stylus encounters a smaller diameter or deviation such as a groove or the like in the template, the valve stem 141 will spring to a centered position thereby relieving the pressure on ball 147, whereupon the plunger 148 will move upwardly under influence of the compression spring 166 disposed against the lower end of the plunger. This, of course, opens the annular passageway 160 to the passageway 161 to cause flow of fluid through line 157 causing the cylinder and tool slide to feed in toward the work.

Since the control valve also is mounted upon the tool slide assembly, the valve and stylus unitarily will move toward the template. This feeding motion continues so long as the tip of the stylus is out of contact with the template. Bearing in mind that the tool slide moves in a line at 45° to the longitudinal carriage feed and that the rate of both feeds correlated, the tool and stylus move in a straight line toward the work and template. When the tip of the stylus again contacts the template surface, the valve plunger again will be shifted to its neutral closed position to halt further infeed of the tool slide and stylus. When the stylus encounters a shoulder or outward deviation along the template surface it will, of course, be forced outwardly. Outward motion of the template causes the valve stem 141 to be tilted angularly beyond the closed or neutral position causing the plunger 148 to be moved downwardly to cause a fluid discharge from passageway 160 to passageway 162 causing the cylinder, tool and stylus unitarily to move away from the work surface and template surface respectively.

In the event that the stylus encounters a square shoulder, the valve stem will be tilted slightly in a plane parallel with the axis of the template. This motion is permitted by the universal mounting provided by the bearing 143. The displacement of the valve stem angularly causes the tool and stylus immediately to feed away from the work in a line duplicating the profile of the template. In the instance of a square shoulder the template will follow a straight line at right angles to the axis of the work following the angle of the shoulder.

It will be apparent that the tip of the stylus on encountering a shoulder will tend to rotate the valve stem 141 on its vertical axis. In order to prevent this, means are provided in the valve body which permits angular shifting of the stem relative to the body but which locks the stem against rotation as hereinafter described.

If the shoulder is obliquely angular, the stylus and cutting tool will follow the angular line and upon reaching the full diameter, the stylus will pass around the corner and continue down the new diameter, the tip of the tool, of course, following accurately the path described by the tip of the stylus. Should the tip of the stylus encounter an undercut, the same procedure will occur and the undercut will be duplicated in the work piece. In the case of square shoulders and undercuts, it will be apparent that the working end of the cutting tool should be formed at an angle in order that the cutting tip of the tool may be disposed in advance of the body of the tool. This provides clearance so that only the tip of the tool performs the cutting operation, with clearance between the shoulder and the side of the tool. It will be apparent that various angles, curves and fillets will be reproduced since the cutting tool follows exactly the path traced by the tip of the stylus.

Due to the design of the valve 68, substantially no lag occurs between the change in direction of the tip of the stylus and the actual feeding movements of the cutting tool. In other words the plurality of annular passageways of the valve plunger causes a very minute stylus motion to produce a maximum discharge of fluid to the cylinder in the appropriate direction. Consequently a very minor variation in contour immediately actuates the valve from its neutral or closed position to its actuating position thus energizing the duplicating apparatus immediately.

In order to cause a uniform feed rate the hydraulic system incorporates suitable metering apparatus which insures a uniform flow of fluid independent of the degree of valve opening.

The valve is extremely sensitive and as shown in Figure 10, tip of the stylus 99 is resting lightly against the template surface to hold the valve plunger in its closed or neutral position. Any minute profile irregularity therefore will cause the plunger to move from its closed position to cause tool slide feed.

In order to form the shoulder contours the apparatus is set to work toward increasing diameters instead of the direction of reducing diameters. For this purpose the stylus is set at an angle pointing toward its direction of travel and the cutting tool likewise is set with its cutting edge disposed toward the direction of travel. The tip of the stylus preferably tapers to a relatively sharp point so as to trace accurately the minute variations in the profile such as sharp corners and edges. Therefore as the pointed tip of the stylus contacts a shoulder formed by an increased diameter of the template, the stylus and valve stem is tripped minutely in a lateral direction causing immediate outfeed of the tool slide and stylus accurately reproducing the shoulder.

In duplicating work of the type illustrated in Figure 2, having both increasing and decreasing diameters, the increasing diameters preferably duplicated with the stylus tracing toward the shoulders from the small end of the template. After completion of the operation, the template and work piece then are turned end for end and the carriage returned to the tailstock end of the machine. The operation is now repeated, again in the direction of the increasing diameters to form the opposite end of the work piece.

In the present disclosure a turret type tool post is provided to permit the use of a roughing tool and a finishing tool whereby the rough cut first may be made then the tool post repositioned to apply a finishing tool to the work. It will be apparent that additional cutting tools may be carried in the tool post according to the nature of the work. The tool post indicated generally at 36 therefore includes a clamping lever 171 by means of which the post may be unclamped and rotated on its vertical axis and reclamped in its new position. As shown in Figure 3, the base 172 of the tool post is engaged by means of a bolt head 173 engaged in a T-slot 174 formed in the tool slide plate 35. The tools are clamped in the post by means of a plurality of clamping bolts 175 passing through an overhanging ledge, 176 forming a part of the assembly. The rough cutting tool is indicated at 177 and the finishing tool at 178. These cutting tools are located permanently in the post in setting up the machine and having been adjusted correctly, the roughing and finishing cut may be repeated in sequence without readjustment of the tools. After the rough cut is made, the clamping lever 171 is operated to unclamp the tool post which may then be indexed 180° about its axis to present the finishing tool to the work and the same operation is repeated.

It will be apparent that in duplicating work having constantly increasing diameters, the duplication may be made in one operation instead of requiring the work and template to be reversed end for end. In this instance the forming operation is started at the small end of the work and the rough cut is followed by a finish cut which completes the operation.

As illustrated in Figures 13 and 14, the cylindrical template may include a roughing side and a finishing side. In other words, the contour of the template may be modified in order to omit the minor variations in contour during the roughing cut. As illustrated, the shallow groove 180 for example may be filled in by brazing or the like as at 181 on the roughing side of the template. After the rough cut has been made, the template may be rotated on its longitudinal axis as shown in Figure 14 to present its grooved face to the tip of the stylus. The finishing tool then will duplicate the groove 180 in the work piece on the finishing cut. As another example, the sharp corners at the base of the shoulders may be eliminated in the roughing cut by providing a fillet 182 on the roughing side of the template and a sharp corner on the finishing side as indicated at 183 as shown in Figure 2. Additional profiles may be provided if the work so requires in which case additional cutting tools may be mounted in the tool post.

As disclosed in Figures 7 and 8, a flat template 113 may be utilized in place of the cylindrical template 116 if this is desired. The flat template is operated in identically the same manner as is the cylindrical template. In the form illustrated, the template provides a series of steps 184, each defining the shoulder of an increasing diameter and terminating in a taper 185. As applied to this profile, the work may be duplicated in one roughing cut and one finishing cut, the stylus being disposed at an angle to the longitudinal axis of the template as shown to permit the tip of the stylus to work toward the shoulders.

In order to permit vertical adjustment of the valve 68 to center the tip of the stylus with respect to the templates, the valve is mounted in a clamping fixture 186 secured to flange 64 by screws 187 passing through the base flanges 188—188 of the fixture as shown in Figure 9. A split ring 190 embraces the cylindrical valve body 140 and a clamping screw 191 engages the ends of the ring across the gap 192. Thus the screw 191 may be loosened and the valve shifted vertically to align the stylus 89 either with the flat template 113 or with the round template or model 116.

As shown in Figures 2 and 3 a juncture block 193 may be secured to the side of the arm 61. The fluid lines 157 and 158 leading from the control valve to this block are flexible to permit relative movement between the valve and the juncture block when the valve is adjusted relative to the template by actuation of handwheel 66. Since there is no relative movement between the cylinder 37 and the arm 61 the lines 157 and 158 between the juncture block and cylinder may be formed of stiff material such as copper tubing. The several control shafts and tubes extending along the side of arm 61 may be enclosed by a shield 194 as shown in Figure 4 to present a neat appearance and to avoid the accumulation of chips and cuttings.

As previously noted the valve stem 141 is provided with means to prevent rotation but to permit universal angular displacement of the stem. Referring to Figure 10 this mechanism comprises a cross pin 195 having its opposite ends journalled in bearings 196 disposed in opposite sides of the valve body 140. The cross pin extends diametrically across the bore of the body and through the center of the actuating stem 141 for which purpose the stem includes an elongated slot 197. The slot 197 is substantially the same width as the diameter of the cross pin 195 to provide a sliding engagement of the pin in the slot.

It will be noted that the opposite ends 198 of the pin, which are journalled in bearings 196, are offset with respect to the intermediate body portion of the pin. Therefore the intermediate portion of the pin constitutes in effect a crank throw permitting angular movement of the stem at right angles to the axis of the pin 196. In other words although the cross pin body is closely embraced in the slot 197, the body portion being eccentric with respect to the ends 198, will swing in an arch to permit angular shifting of the stem at right angles to the axis of the pin. Angular displacement of the stem longitudinally of the pin is permitted since the sliding engagement of the pin in the slot 197 permits the stem to shift relative to the pin longitudinally. Therefore the stem 141 is free to be shifted angularly in any direction but is locked against rotation by the cross pin 195. The arrangement operates with a minimum of resistance so as to confine the stem securely against rotation and at the same time avoids any effect in the sensitivity of the tracer valve.

Having described our invention, we claim:

1. A template controlled slide structure for duplicating longitudinal work pieces on a lathe, the lathe having template mounting means for supporting a template parallel with the longitudinal axis of the work piece and having a carriage translatable longitudinally relative to the work piece, the carriage having cross slide slideways positioned transversely thereof, said template controlled slide structure comprising a cross slide block slidable along said slideways for movement substantially at right angles relative to the longitudinal axis of the work piece, means for sliding said cross slide block, tool slide slideways carried by said cross slide block and positioned at an oblique angle relative to the longitudinal axis of the work piece and to said cross slide slideways, a tool slide slidable along said tool slide slideways at said angle, power means for shifting said tool slide, a cutting tool carried by said tool slide, said tool slide having a rearwardly extended arm, a tracer block slideway on said arm disposed substantially at right angles to the longitudinal axis of the work piece and parallel to said cross slide slideways, a tracer slide block mounted upon said tracer block slideway, said tracer slide block movable substantially at right angles to the longitudinal axis of the work piece and parallel to said cross slide movement, a tracer unit mounted upon said tracer slide block and connected to said power means to control the same, a stylus associated with the said tracer unit, said stylus adapted to brace a template which is supported by said template mounting means of the lathe parallel to the longitudinal axis of the work piece, and means for sliding said tracer slide block and tracer unit to vary the spacing between the stylus and said cutting tool.

2. A template controlled slide structure for duplicating longitudinal work pieces on a lathe, the lathe having template mounting means for supporting a template parallel with the longitudinal axis of the work piece and having a carriage translatable longitudinally relative to the work piece, the carriage having cross slide slideways positioned transversely thereof, said template controlled slide structure comprising a cross slide block slidable along said slideways for movement substantially at right angles relative to the longitudinal axis of the work piece, means for sliding said cross slide block, tool slide slideways carried by said cross slide block and positioned at an oblique angle relative to the longitudinal axis of the work piece and to said cross slide slideways, a tool slide slidable along said tool slide slideways at said angle, power means for shifting said tool slide, a cutting tool carried by said tool slide, said tool slide having a rearwardly extended arm, a tracer block slideway on said arm disposed substantially at right angles to the longitudinal axis of the work piece and parallel to said cross slide slideways, a tracer slide block mounted upon said slideway, said tracer block movable substantially at right angles to the longitudinal axis of the work piece and parallel to said cross slide movement, a tracer unit mounted upon said tracer slide block and connected to said power means to control the same, a stylus associated with the said tracer unit, said stylus adapted to trace a template which is supported by said template mounting means of the lathe parallel to the longitudinal axis of the work piece, a screw shaft engaged in the tracer slide block, a hand wheel at the forward end of the tool slide, an angulated shaft connecting the hand wheel to the screw shaft, and a universal joint interposed in said angulated shaft, whereby rotation of the hand wheel, angulated shaft and screw shaft is effective to slide the tracer slide block and tracer unit to vary the spacing between the stylus and cutting tool.

3. A template controlled slide structure for duplicating longitudinal work pieces on a lathe, the lathe having template mounting means for supporting a template parallel with the longitudinal axis of the work piece and having a carriage translatable longitudinally relative to said work piece, the carriage having cross slide slideways positioned transversely thereof, said template controlled slide structure comprising a cross slide block slidable along said slideways for movement substantially at right angles relative to the longitudinal axis of the work piece, means for sliding said cross slide block, tool slide slideways carried by said cross slide block and positioned at an oblique angle relative to the longitudinal axis of the work piece and to said cross slide slideways, a tool slide slidable along said tool slide slideways at said angle, a hydraulic cylinder mounted upon said tool slide, a piston rod extending from the cylinder and connected to said cross slide block whereby the cylinder is operative to shift said tool slide, a cutting tool carried by said tool slide, said tool slide having a rearwardly extended arm, a tracer block slideway on said arm disposed substantially at right angles to the longitudinal axis of the work piece and parallel to said cross slide slideways, a tracer slide block mounted upon said tracer block slideway, said tracer slide block movable substantially at right angles to the longitudinal axis of the work piece and parallel to said cross slide movement, a tracer valve mounted upon said tracer slide block, conduits extending from the tracer valve to said hydraulic cylinder to actuate the same and thereby shift the tool slide in response to operation of the tracer valve, a stylus associated with the tracer valve to operate the same, said stylus adapted to trace a template which is supported by said template mounting means parallel with the longitudinal axis of the work piece, and means for sliding said tracer slide block and tracer valve to vary the spacing between stylus and said cutting tool.

4. A template controlled slide structure for duplicating longitudinal work pieces on a lathe, the lathe having template mounting means for supporting a template parallel with the longitudinal axis of the work piece and having a carriage translatable longitudinally relative to the work piece, the carriage having cross slide slideways positioned transversely thereof, said template controlled slide structure comprising a cross slide block slidable along said slideways for movement substantially at right angles relative to the longitudinal axis of the work piece, means for sliding said cross slide block, tool slide slideways carried by said cross slide block and positioned at an oblique angle relative to the longitudinal axis of the work piece and to said cross slide slideways, a tool slide slidable along said tool slide slideways at said angle, power means for shifting said tool slide, a cutting tool carried by said tool slide, said tool slide having a rearwardly extended arm, a tracer block slideway on said arm disposed substantially at right angles to the longitudinal axis of the work piece and parallel to said cross slide slideways, a tracer slide block mounted upon said tracer block slideway, said tracer slide block movable substantially at right angles to the longitudinal axis of the work piece and parallel to said cross slide movement, a tracer unit mounted upon said tracer slide block and connected to said power means to control the same, a stylus associated with the said tracer unit, said stylus adapted to trace a template which is supported by said template mounting means of the lathe parallel to the longitudinal axis of the work piece, means for sliding said tracer slide block and tracer unit to vary the spacing between the stylus and said cutting tool, a hand lever mounted upon the forward portion of the tool slide, an angulated connecting shaft extended from said lever to the tracer unit, and a universal joint in said angulated shaft, said shaft adapted to actuate the tracer unit independently of said stylus upon manual operation of said hand lever.

MANUEL TURCHAN.
WILLIAM G. HOELSCHER.

REFERENCES CITED

The following references are of record in the file of this patent:

UNITED STATES PATENTS

| Number | Name | Date |
|---|---|---|
| 1,166,126 | Gridley | Dec. 28, 1915 |
| 1,199,312 | Sparks | Sept. 26, 1916 |
| 1,289,674 | Coradi | Dec. 31, 1918 |
| 1,679,362 | Knowlton | Aug. 7, 1928 |
| 1,694,022 | Shaw | Dec. 4, 1928 |
| 2,007,899 | Shaw | July 9, 1935 |
| 2,011,086 | Shaw | Aug. 13, 1935 |
| 2,350,190 | Quick | May 30, 1944 |
| 2,375,831 | Turchan | May 15, 1945 |
| 2,397,108 | Hanna | Mar. 26, 1946 |
| 2,422,682 | Johnson | June 24, 1947 |
| 2,437,570 | Von Zelewsky | Mar. 9, 1948 |

FOREIGN PATENTS

| Number | Country | Date |
|---|---|---|
| 623,357 | Germany | Dec. 18, 1935 |